(12) United States Patent
Reznik et al.

(10) Patent No.: US 9,449,531 B2
(45) Date of Patent: *Sep. 20, 2016

(54) VISION ASSISTIVE DEVICES AND USER INTERFACES

(71) Applicant: Freedom Scientific, Inc., St. Petersburg, FL (US)

(72) Inventors: Leon Reznik, Sudbury, MA (US); Lev Lvovsky, Waban, MA (US); Helen Reznik, Sudbury, MA (US); Levy Ulanovsky, Newton, MA (US)

(73) Assignee: Freedom Scientific, Inc., St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/169,736

(22) Filed: Jan. 31, 2014

(65) Prior Publication Data

US 2014/0146151 A1    May 29, 2014

Related U.S. Application Data

(63) Continuation of application No. 13/829,727, filed on Mar. 14, 2013, now Pat. No. 8,681,268.

(60) Provisional application No. 61/688,909, filed on May 24, 2012.

(51) Int. Cl.
*H04N 5/225* (2006.01)
*H04N 5/232* (2006.01)
(Continued)

(52) U.S. Cl.
CPC ............. *G09B 21/008* (2013.01); *G03B 17/02* (2013.01); *H04N 1/00496* (2013.01); *H04N 1/00559* (2013.01); *H04N 1/00562* (2013.01); *H04N 1/19594* (2013.01); *H04N 5/2252* (2013.01)

(58) Field of Classification Search
CPC ............. H04N 5/2252; H04N 5/2253; H04N 5/2258; H04N 5/23238; H04N 5/23277; H04N 5/23212
USPC ......... 348/218.1, 345, 239, 143, 155, 207.1, 348/372, 221.14, 373–376, 207.99, 211.4, 348/207.11
See application file for complete search history.

(56) References Cited

U.S. PATENT DOCUMENTS

D211,414 S    6/1968  Hockenberry
D254,868 S    4/1980  Hoadley
(Continued)

FOREIGN PATENT DOCUMENTS

EP   2065871         5/2010
JP   2005318023 A  * 11/2005  ............. H04N 5/222
JP   2005318023     11/2006

OTHER PUBLICATIONS

International Search Report for International Application No. PCT/US2013/042391 mailed Aug. 13, 2013.
(Continued)

*Primary Examiner* — Sinh Tran
*Assistant Examiner* — Xi Wang
(74) *Attorney, Agent, or Firm* — GrayRobinson, P.A.; Michael J. Colitz, III

(57) ABSTRACT

Vision assistive device and user interface are disclosed. In some embodiments, a vision assistive device includes a housing having a base for positioning the housing on a surface; one or more imaging units disposed along a top portion of the housing, each imaging unit being angled downward so a central axis of the imaging unit forms an acute angle with the surface so the imaging unit captures a target image from a target object; and a control system accommodated within the housing, the control system being connected to the one or more imaging units to process the target image captured by each imaging unit and to output the target image to a user.

17 Claims, 13 Drawing Sheets

(51) Int. Cl.
*G09B 21/00* (2006.01)
*G03B 17/02* (2006.01)
*H04N 1/00* (2006.01)
*H04N 1/195* (2006.01)

(56) References Cited

U.S. PATENT DOCUMENTS

| | | | |
|---|---|---|---|
| D270,277 S | 8/1983 | Studer | |
| 4,888,195 A | 12/1989 | Huhn et al. | |
| 4,928,170 A | 5/1990 | Soloveychik et al. | |
| 5,633,674 A | 5/1997 | Trulaske et al. | |
| D430,588 S | 9/2000 | Goldberg et al. | |
| 6,115,482 A | 9/2000 | Sears et al. | |
| 6,198,547 B1* | 3/2001 | Matsuda | 358/474 |
| 6,570,583 B1* | 5/2003 | Kung | G06F 1/1626 345/661 |
| 6,731,326 B1 | 5/2004 | Bettinardi | |
| 6,791,600 B1 | 9/2004 | Chan | |
| 6,965,862 B2 | 11/2005 | Schuller | |
| 7,626,634 B2 | 12/2009 | Ohki et al. | |
| D623,214 S | 9/2010 | Onoda | |
| 7,805,307 B2 | 9/2010 | Levin et al. | |
| 7,899,310 B2* | 3/2011 | Hsieh | F16M 11/08 396/428 |
| 8,113,841 B2 | 2/2012 | Rojas et al. | |
| 8,194,154 B2 | 6/2012 | Yoon et al. | |
| 8,284,999 B2 | 10/2012 | Kurzweil et al. | |
| 8,681,268 B2* | 3/2014 | Reznik et al. | 348/373 |
| 2003/0043114 A1* | 3/2003 | Silfverberg et al. | 345/157 |
| 2004/0165100 A1* | 8/2004 | Motta | 348/362 |
| 2008/0260210 A1 | 10/2008 | Kobeli et al. | |
| 2009/0225164 A1 | 9/2009 | Renkis | |
| 2009/0244301 A1* | 10/2009 | Border et al. | 348/208.99 |
| 2010/0201801 A1 | 8/2010 | Maruyama et al. | |
| 2010/0271534 A1* | 10/2010 | Lin | G02B 27/0075 348/340 |
| 2011/0128825 A1* | 6/2011 | Tanaka | 368/29 |
| 2011/0194155 A1 | 8/2011 | Kasuga | |
| 2012/0001999 A1 | 1/2012 | Schirdewahn et al. | |
| 2012/0154543 A1* | 6/2012 | Kasuga | 348/47 |
| 2013/0187774 A1 | 7/2013 | Muecke et al. | |
| 2013/0314593 A1 | 11/2013 | Reznik et al. | |

OTHER PUBLICATIONS

Office Action in U.S. Appl. No. 13/829,727 dated Aug. 1, 2013.
Liang, Jian, Doermann, David, Huiping, Li; "Camera-based analysis of text and documents: a survey"; International Journal of Document Analysis and Recognition (IJDAR), Springer, Berlin, DE, vol. 7, No. 2-3, Jul. 1, 2005 (Jul. 1, 2005), pp. 84-104, XP019352711, ISSN: 1433-2825, DOI: 10.1007/S10032-004-0138-Z.

* cited by examiner

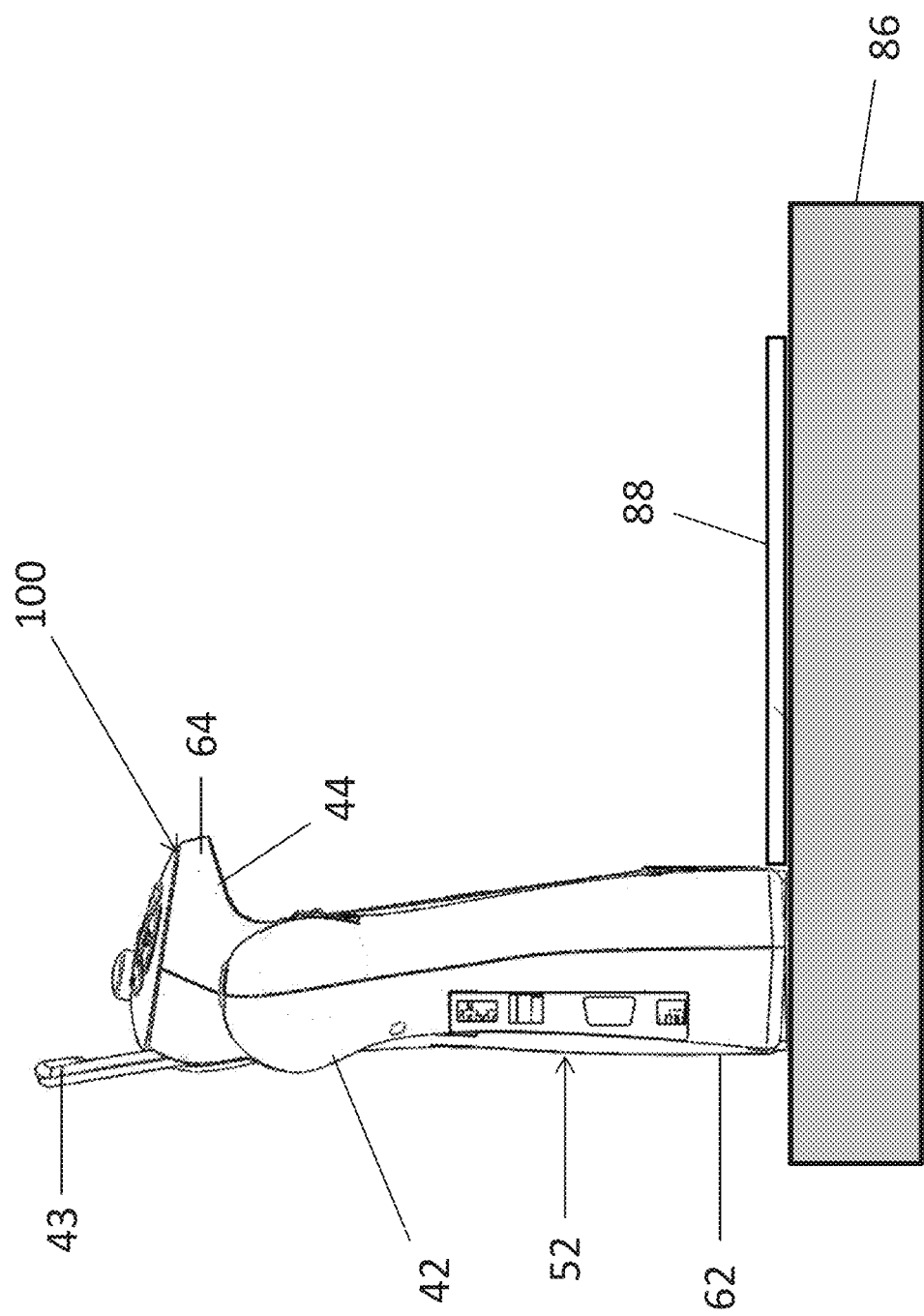

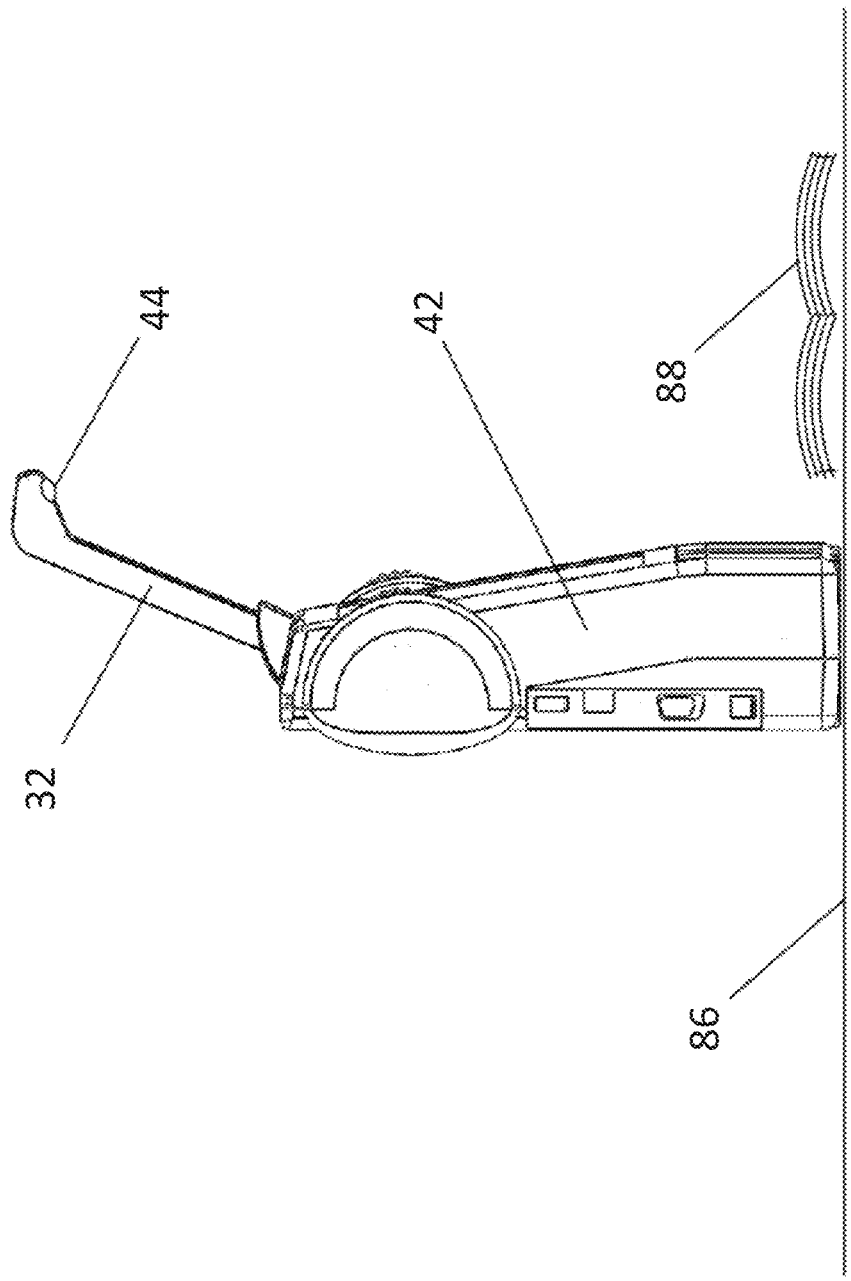

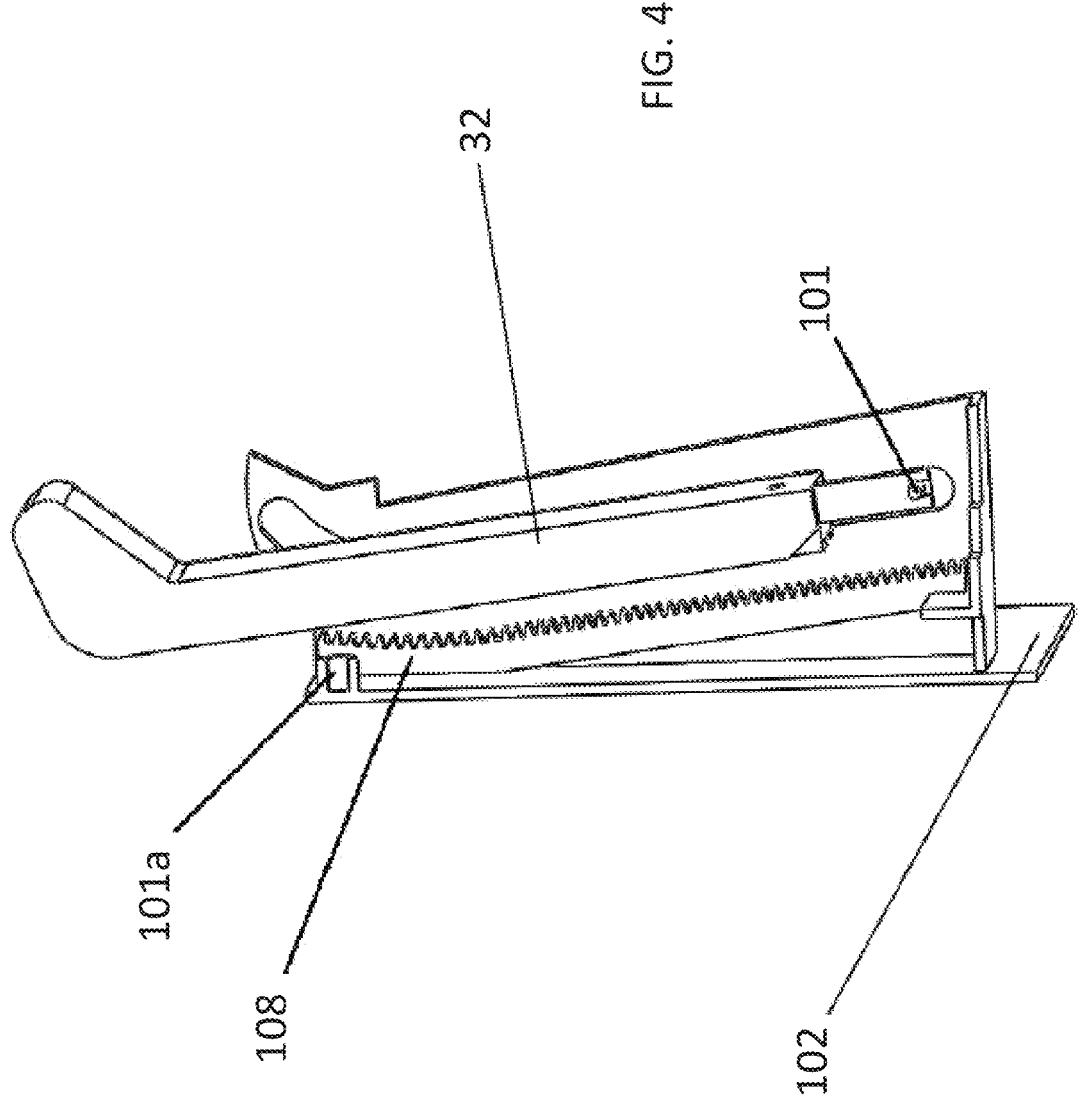

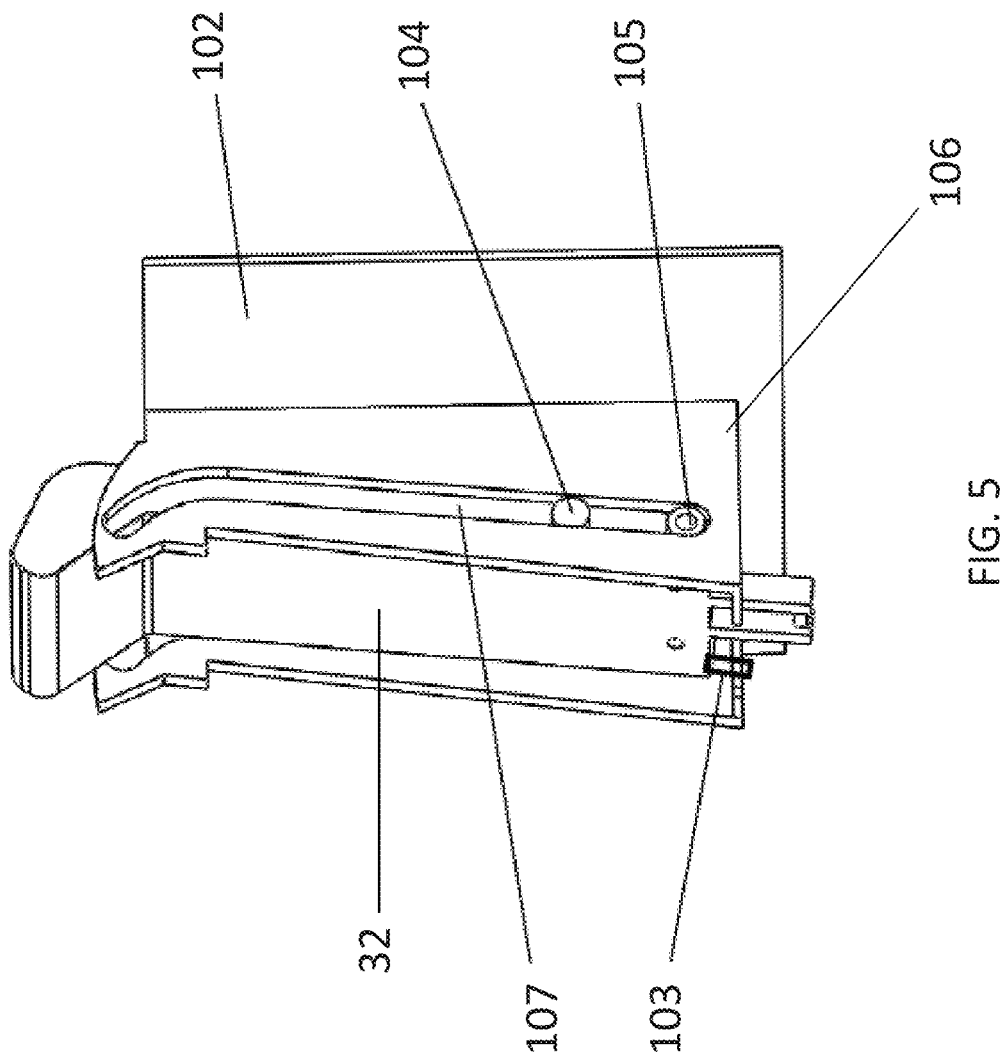

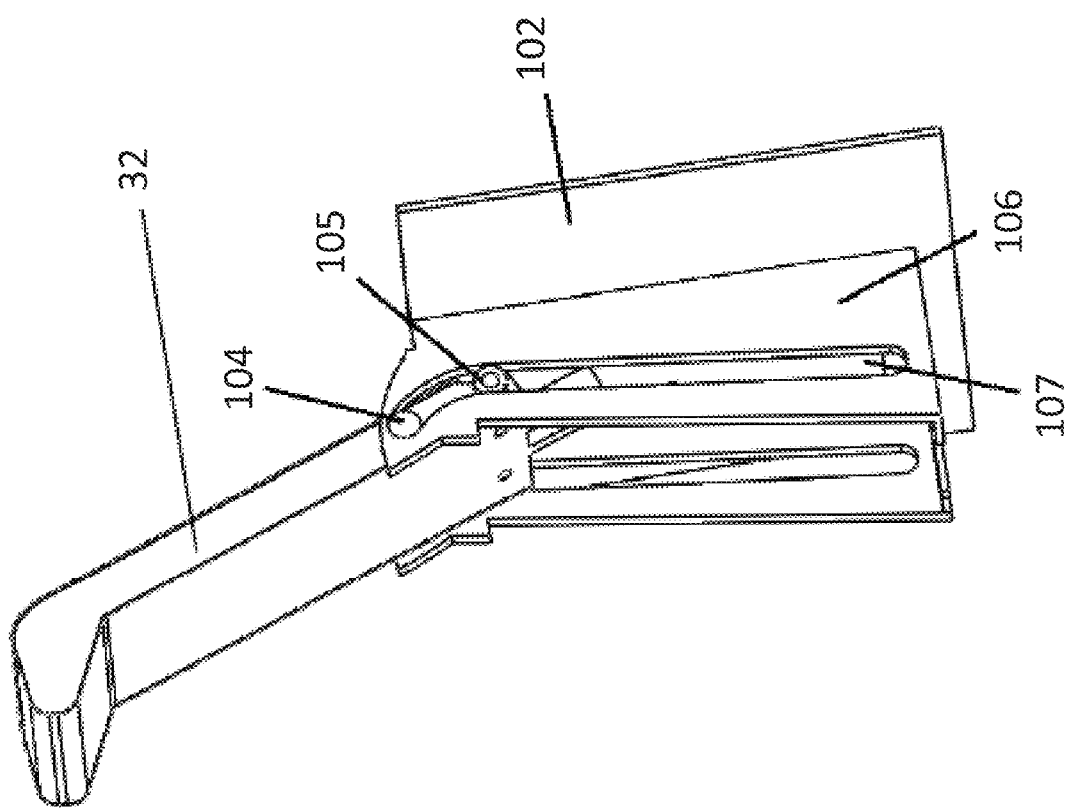

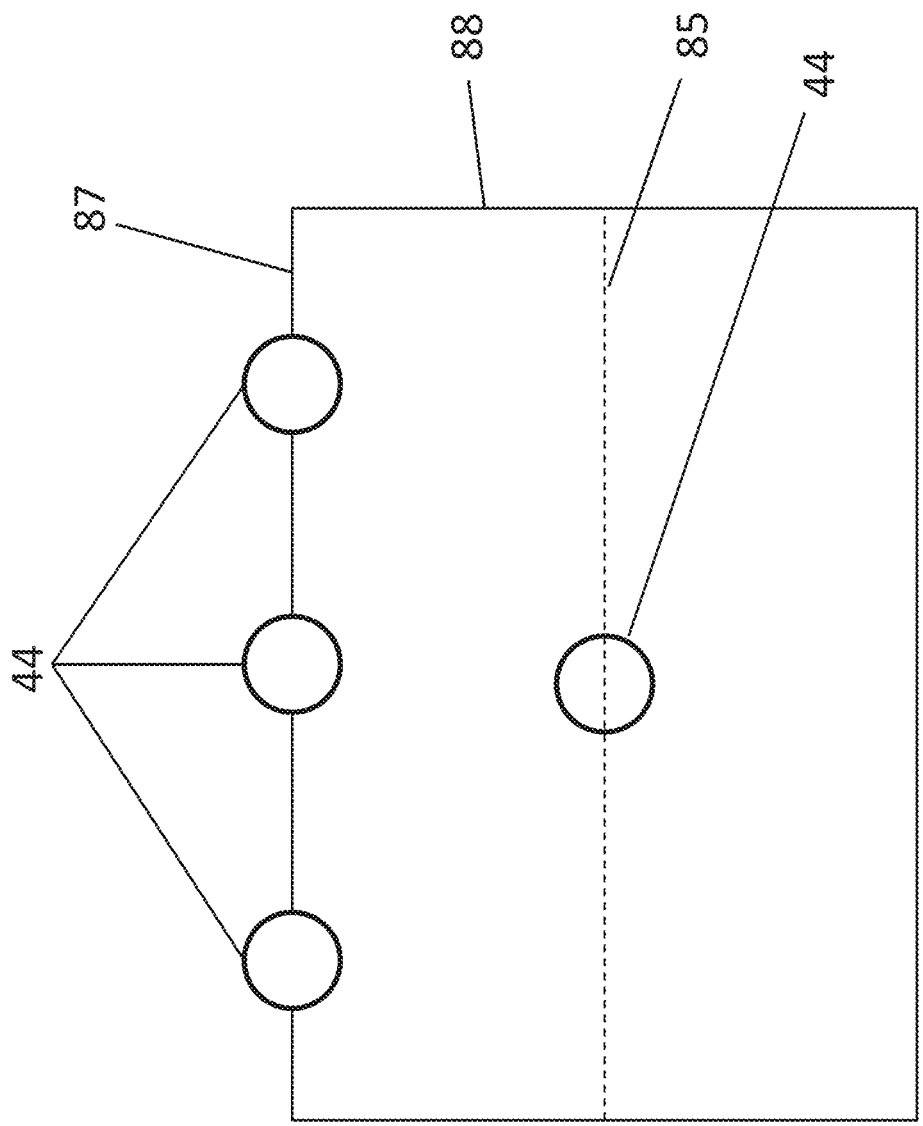

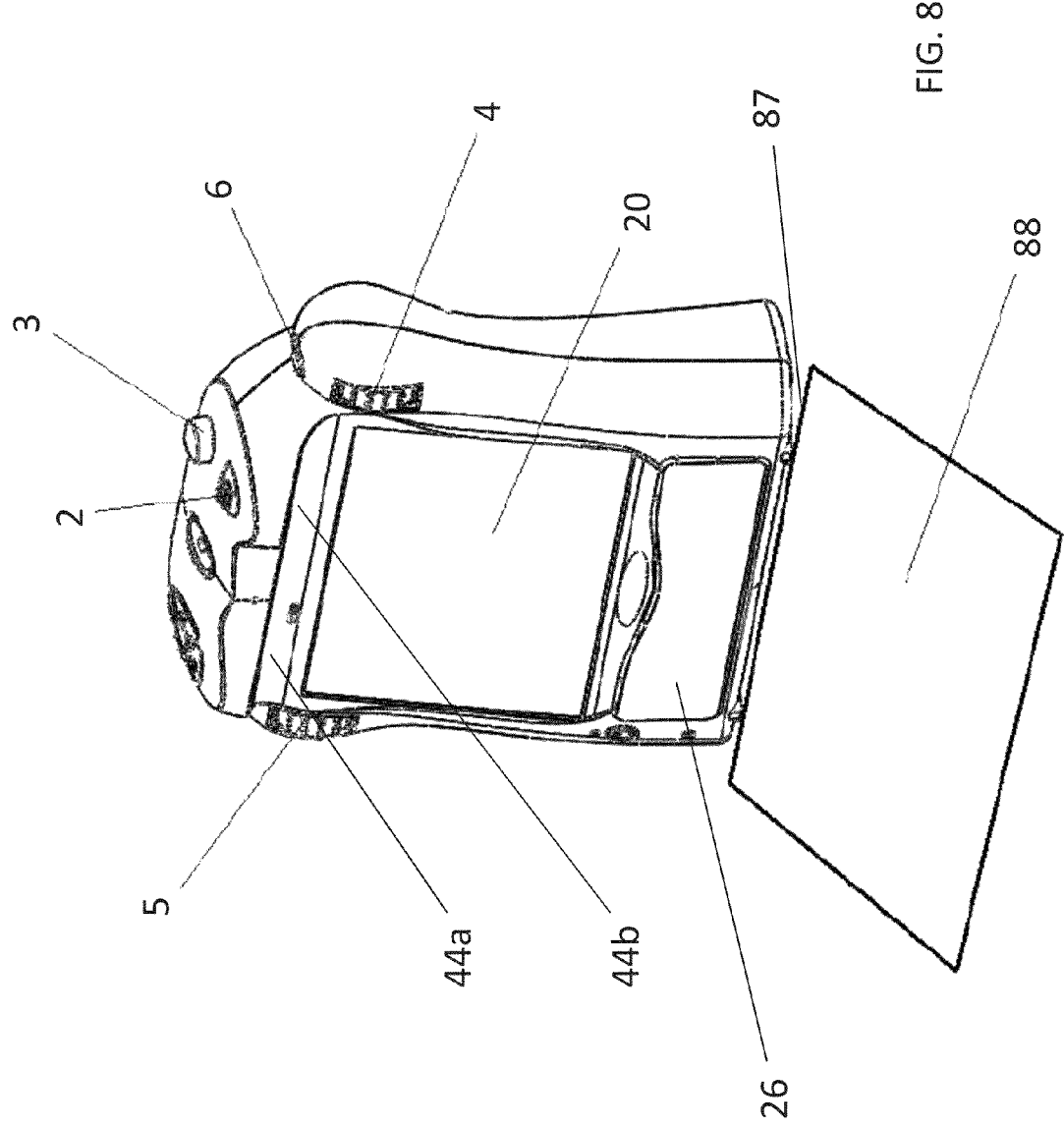

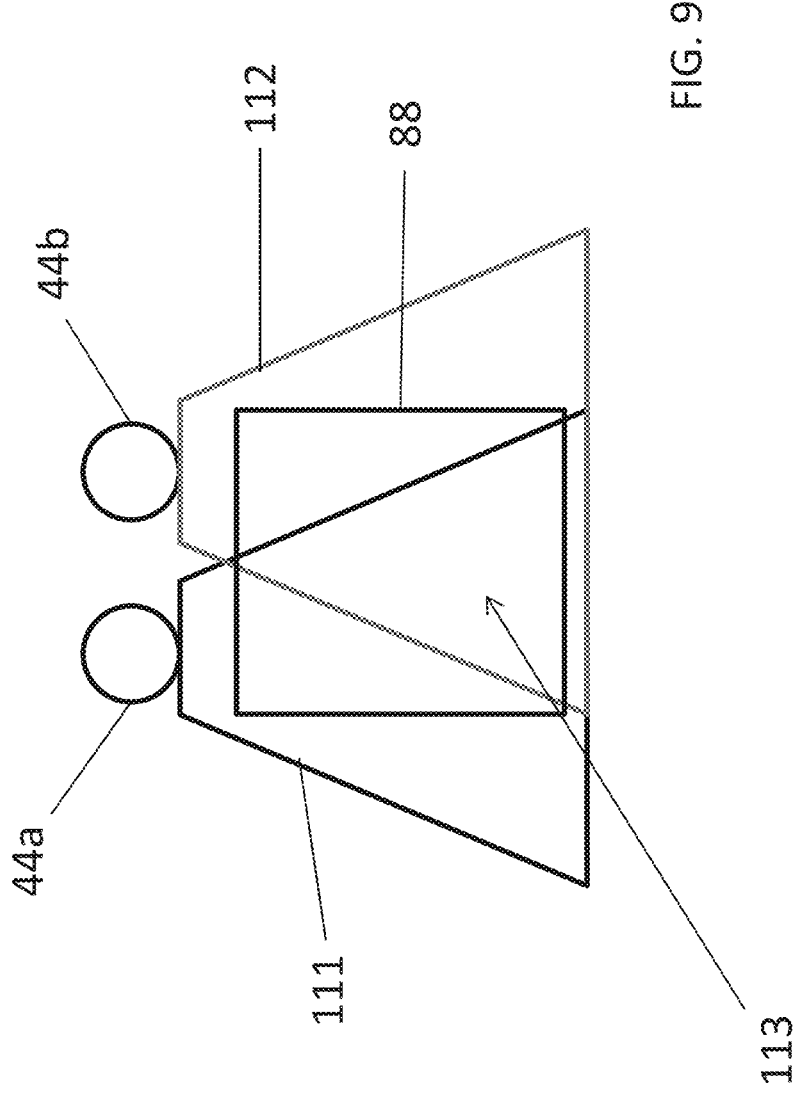

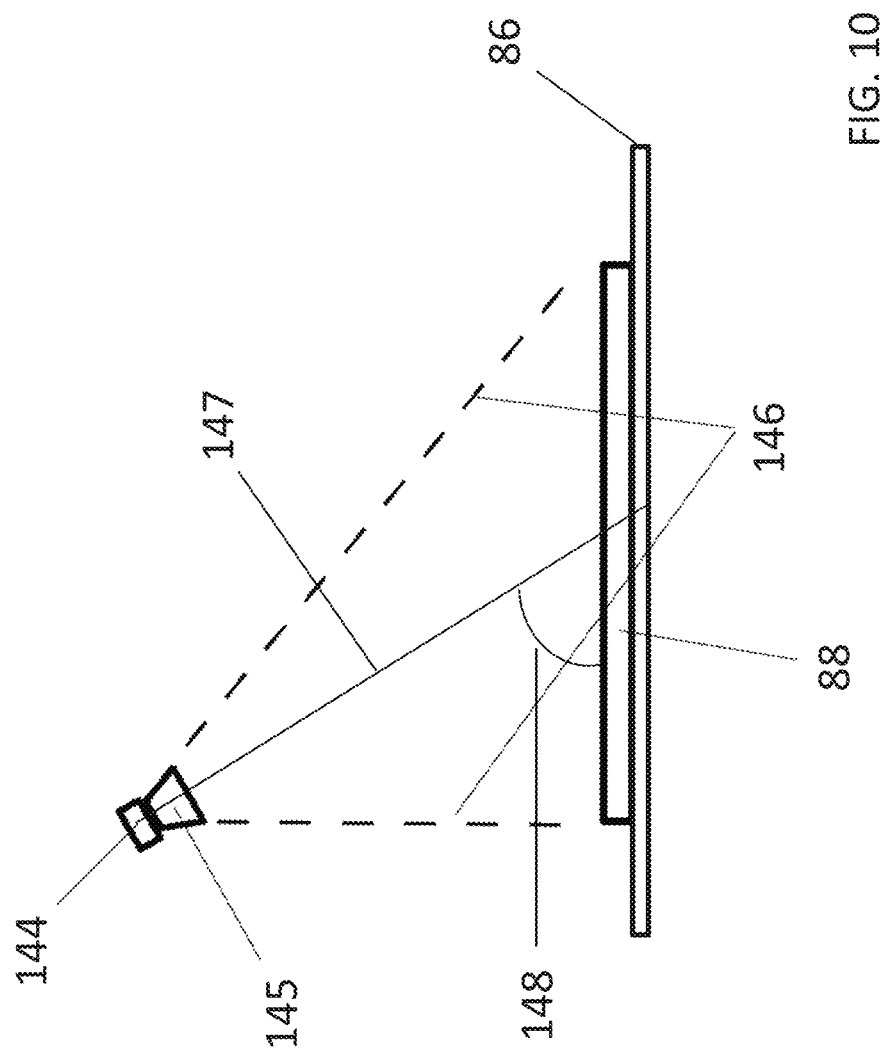

VISION ASSISTIVE DEVICES AND USER INTERFACES

RELATED APPLICATIONS

This application is a continuation application of U.S. application Ser. No. 13/829,727, filed on Mar. 14, 2013, which claims the benefit of and priority to U.S. Provisional Application No. 61/688,909, filed on May 24, 2012, and both applications are incorporated herein by reference in their entireties.

FIELD

The present disclosure relates to vision assistive devices, and in particular, to free-standing vision assistive devices with one or more imaging units.

BACKGROUND

According to some estimates, nearly 2.9 million Americans are visually impaired. Many more have trouble reading due to other conditions, such as stroke or traumatic brain injury. The prevalence of vision impairment increases rapidly in the later years, particularly after age 75. Even people with the least degree of vision impairment may still face challenges in everyday life as typical everyday activities such as reading a newspaper become difficult if not impossible.

There are a number of vision assistance devices on the market to assist those whose ability to read is impaired by visual difficulties. However, one problem with the current devices is that the current devices require complex set up before they can be used. Moreover, operating current vision assistance devices can be problematic for a visually impaired person due to the heavy reliance of the current vision assistance devices on digital controls, such as a keypad, keyboard, a mouse, or a touch screen. Accordingly, there is still a need for a vision assistive device that is easy to set up and operate.

SUMMARY

Vision assistive devices and user interfaces are disclosed. In some aspects, there is provided a vision assistive device that includes a housing having a base for positioning the housing on a surface; one or more imaging units disposed along a top portion of the housing, each imaging unit being angled downward so a central axis of the imaging unit forms an acute angle with the surface so the imaging unit captures a target image from a target object; and a control system accommodated within the housing, the control system being connected to the one or more imaging units to process the target image captured by each imaging unit and to output the target image to a user.

In some aspects, there is provided a vision assistive device that includes a housing having a base for positioning the housing on a surface; one or more imaging units configured to capture a target image from a target object positioned substantially perpendicular to the housing; a screen integrated with the housing; a control system accommodated within the housing, the control system being connected to the imaging units to process data corresponding to the image captured by the imaging units and to output the target image to a user on the screen.

In some aspects, there is provided a method for providing vision assistance that includes disposing a housing substantially perpendicular to a surface, the housing including one or more imaging units and a control system; capturing with the one or more imaging units a target image from a target object placed on the surface adjacent to the housing; and processing the captured target image and outputting the target image on a screen integrated with the housing.

DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 2 illustrates an embodiment of a vision assistive device of the present disclosure placed on a surface for capturing an image from a target.

FIG. 3A, FIG. 3B, and FIG. 3C illustrate an embodiment of a vision assistive device of the present disclosure having a slidable neck.

FIG. 4, FIG. 5, and FIG. 6 illustrate an embodiment mechanism for operating a slidable neck.

FIG. 7 illustrates various positions of imaging units over a target by a vision assistive device of the present disclosure.

FIG. 8 illustrates an embodiment of a vision assistive device of the present disclosure with integrated imaging units.

FIG. 9 and FIG. 10 illustrate various locations of imaging units relative to a target.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure provides vision assistive devices, systems and methods of use of vision assistive devices and systems.

Figure 1:
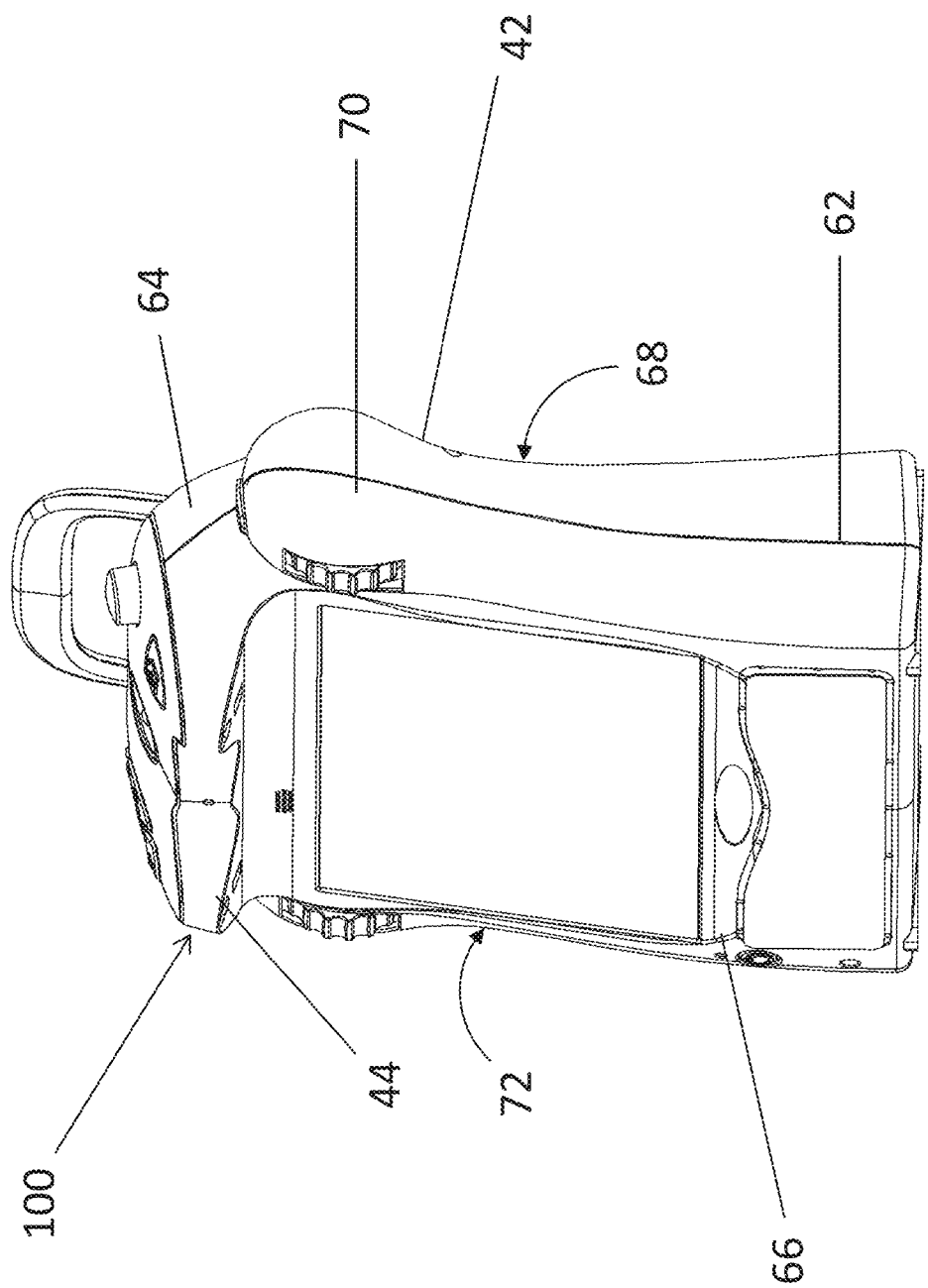
FIG. 1 is a prospective view on an embodiment of a vision assistive device of the present disclosure.

In reference to FIG. 1, a vision assistive device 100 of the present disclosure includes a housing 42. The housing 42 may be made of separate parts integrated into a single unit. The housing 42 may include a base region 62 and a top region 64 connected by a front wall 66, back wall 68, and two side walls 70,72. The walls of the housing 42 may be continuous and, together with the base region 62 and the top region 64, define an inner volume for accommodating therein electrical components (not shown) for carrying out functionalities of the vision assistive device 100, as is described below.

In reference to FIG. 2, the housing 42 can be free standing. In some embodiments, the base region 62 of the housing 42 may be designed to enable the vision assistive device 100 to stand unsupported or unassisted on a surface 86 in operation. In this manner, the vision assistive device 100 can simply be placed on a surface 86, without any further manipulations. In some embodiments, the base region 62 of the housing 42 may be substantially planar to enable the vision assistive device 100 to stand unassisted on the surface 86, substantially perpendicular to the surface. In this manner, a target 88 with a target image (text, indicia, graphics or other images) that the user needs the vision assistance device 100 to capture from the target 88 can be placed on the surface 86 adjacent to the vision assistive device 100 for capturing the images on the target object of paper by the vision assistive device 100, and subsequently communicating the images to the user. In some embodiments, the target 88 may be placed such that one edge of the target is along the housing 42. The surface of the target 88 on which the image is located is preferably substantially planar, however, other shapes may also be accommodated. In some embodiments, the housing 42 may include a foldable or telescopic handle 43 to facilitate carrying the vision assistive device 100.

In reference to FIG. 2, the housing 42 may include a plurality of ports 52 for connecting the electrical components housed inside the housing 42 to external devices and power sources. In some embodiments, the housing 42 may include one or more USB, VGA, HDMI, Ethernet, and other ports for connecting the vision assistive device 100 to external device, including, but not limited to, external data storage, phones, computers, speakers, televisions, monitors, printers and similar devices. The housing 42 may further include one or more slots for insertion of a smart card or memory card. Furthermore, the housing 42 can include wireless interfaces, such as WiFi or Bluetooth. The housing 42 may also support a plurality of control buttons to allow the user to control one or more functions of the vision assistive device 100, which control buttons and functions are described in details below.

In reference to FIG. 1 and FIG. 2, the vision assistive device 100 may include one or more imaging units 44 disposed in the top region 64 of the housing 42. The number of imaging units may vary depending on, for example, the type of the imaging units employed or the size or shape of the target 88. In some embodiments, the vision assistive device 100 may include a single imaging unit. In other embodiments, the vision assistive device 100 may include two imaging units. In yet other embodiments, the vision assistive device 100 may include more than two imaging units.

In some embodiments, the imaging units 44 may be generally down-facing (but not necessarily pointed straight down) to be able to capture the images from the target 88 placed substantially perpendicular to the vision assistive device 100, which is placed, horizontally on the surface 86 on which the vision assistive device 100 is placed. In some embodiments, the imaging units 44 may be oriented relative to the target 88 so the axis of the viewing lens of the imaging units 44 is substantially perpendicular to the surface of the target 88. In other embodiments, the imaging units 44 may be oriented relative to the target 88 so the axis of the viewing lens of the imaging units 44 is at an acute angle to the surface 86. In some embodiments, the imaging unit 44 is oriented with the lens axis at an acute angle to the surface 86 and the lens directing on the center or near the center of the target 88 placed on the surface 86. In some embodiments, the imaging units 44 may be stationary. In other embodiments, the angle of the imaging units 44 can be adjustable, which may facilitate capturing images from a target object placed at various angles relative to the vision assistive device 100.

The imaging units 44 may be any camera such as, CMOS, CCD, or similar, which is capable of capturing still images or videos. The imaging units 44 can be, independently of each other, auto-focused, manually focused, or have a fixed focus with a sufficient focus depth. In some embodiments, the focusing of the imaging units 44 may be electrically controlled by the control system. In some embodiments, the imaging units 44 may be supported by a neck 32.

Figure 3B:
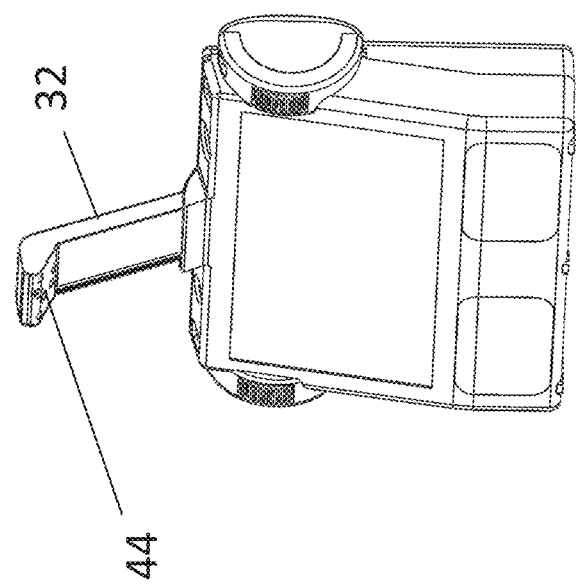
Figure 3A:
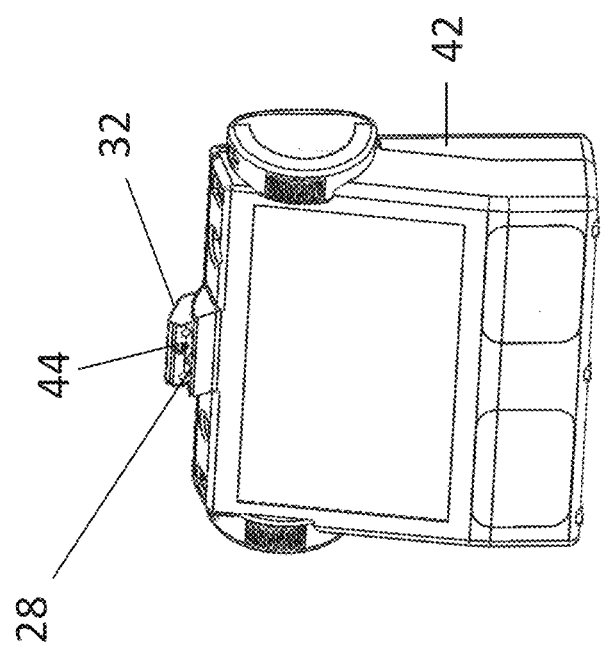

In reference to FIG. 3A, FIG. 3B and FIG. 3C, in some embodiments, the one or more imaging units 44 may be disposed on a telescopic, slidable neck 32, which can slide in and out of the housing 42 through an opening 28 in the housing 42. When the neck 32 is its down-position, the imaging units supported by the neck 32 may be housed within the housing 42 to protect the imaging units 44 from damage when, for example, carrying the visual assistant 100. In operation, the neck 32 may be moved to its up-position to bring out the imaging units 44 out of the housing 42 to allow the imaging units 44 to capture images. As shown in FIG. 3A and FIG. 3B, the neck 32 may be adjusted to position the imaging unit 44 in a desired location relative to the target object from which the images are to be captured. In some embodiments, as shown in FIG. 3C, the neck 32 may be sufficiently extended to place the imaging unit close to or substantially over a central section of the target object to be read by the vision assistive device 100 to minimize image distortion.

FIG. 4, FIG. 5 and FIG. 6 present an exemplary mechanism for moving the neck 32 in and out of the housing 42. A holder 101a may be disposed on a back wall 102 of the housing 42 to attach one end of a spring (such as a constant force spring, not shown) to the housing 42, while a holder 101b may be on the bottom of the neck 32 to tether the other end of the spring 109 to the neck 32. When activated, the spring can act to move the neck 32 from the down-position inside the housing 42 to the up-position outside the housing 42. The back wall 102 of the housing 42 may also support a flange 106 with rail cutouts 107, which are configured to accept pins 104 and 105 protruding from the neck 32. In this manner, the rail cutouts 107 may guide the movement of the neck 32 back and forth between the down-position and the up-position. Additionally or alternatively, corresponding gears 108 may be provided on the back wall 102 of the housing 42 and the neck 32 to control the movement of the neck 32 back and forth between the down-position and the up-position, and vice versa. As shown in FIG. 5, in some embodiments, a push-push latch 103 may be attached to the bottom of neck 32. When locked (engaged), the push-push latch 103 may lock the neck 32 in the down-position while the spring is pulling (but not moving) neck 32 up. To extend the neck 32 out of the housing 42, the user can press the neck 32 down, disengaging the push-push latch 32 and allowing the spring to extend the neck tout of the housing 42. To collapse the neck from the up-position, the user can push the neck 32 down until the push-push latch 103 locks the neck 32 in the down-position.

In reference to FIG. 7, as described above, a telescopic neck 32 enables placement of the imaging units 44 away from the housing 42, in proximity to the center of the target 88. In some embodiments, the neck 32 may position the imaging unit 44 a desired distance between the housing 42 and the center of the target 88. In some embodiments, the neck 32 may position the imaging unit 44 substantially over the center of the target 88. Alternatively or additionally, the vision assistive device 100 may include one or more imaging units 44 integrated with the housing 42. In this manner, the imaging units 44 may be positioned between a centerline 85 of the target 88 and an edge 87 of the target 88. In some embodiments, the imaging units 44 may be positioned substantially over and in alignment with the edge 87 of the target 88 positioned on the surface 86 adjacent the base region 62 of the housing 42. In some embodiments, the imaging units 44 may be disposed substantially along the wall 41 of the housing 42. As noted above, the imaging units 44 may be positioned at various angles to the target 88. In some embodiments, when the imaging unit is positioned over the center of the target 88, the imaging unit 44 may need to be directed straight down toward the target 88, that is, with the lens axis substantially perpendicular to the surface 86 and the target 88. In some embodiments, however, when the imaging units 44 are integrated with the housing, the lens axis of the integrated imaging units may be at an acute angle or angle less than 90° relative to a horizontal surface substantially perpendicular to the housing 42, such, as for example, the surface 86 or the surface of the target 88 from which the image is captured, in instances when such surface of the target is generally planar and substantially parallel to the surface 88. In some embodiments, the lens axis of the integrated imaging units may be at an angle between about 5° and about 50° relative to the surface 86 or the target 88. In some embodiments, the lens axis of the integrated imaging units may be at an angle between about 10° and about 30° relative to the surface 86 or the target 88. In some embodiments, the lens axis of the integrated imaging units may be at an angle between about 15° and about 20° relative to the surface 86 or the target 88. In some embodiments, the lens axis may be positioned parallel to the surface 86.

In some embodiments, the imaging units 44 may be positioned in a fixed location in the top region 64 of the housing 42. For example, the vision assistive device 100 may include a single imaging unit 44, which may be positioned on the front side of the housing 42 substantially along a centerline of the housing 42.

In reference to FIG. 8, in some embodiments, the vision assistive device 100 may include two imaging units 44a and 44b. The imaging units 44a and 44b may be positioned along the top region 64 of the housing 42 and may be spaced away from the side walls of the housing 42 and spaced away from one another. As shown in FIG. 10, each of the imaging units 44a, 44b, which may comprise of a sensor and a lens, may be down-facing such that their respective viewing area is a respective portion of the target 88 to capture an image of that portion of the target 88, and the images of the respective portions captured by the imaging units 44a, 44b may be subsequently combined, such as by stitching, together by the control system, as will be described below. For example, in embodiments employing two imaging units, each imaging unit may be responsible for slightly more than half of the target 88 to enable the captured images to overlap for subsequent stitching by the control system. The exact position of the imaging units 44a and 44b along the top region 64 of the housing 42 may depend on the resolution and field of view of the imaging units 44a and 44b. In some embodiments, each imaging unit 44a and 44b may be covering slightly more than one half of the total area of the target 88. Because in the embodiments with multiple imaging units, each of the imaging units 44a, 44b only needs to cover slightly more than one half of the total area of the target 88, the combined resolution of such system is almost double (with discount for the overlap) the resolution comparing to a similar system with only one imaging unit 44 covering the total area of the target 88. Accordingly, the higher the number of imaging units, the lower resolution imaging units may be employed.

In reference to FIG. 9, generally, the imaging units 44a and 44b may be positioned such that the fields of view 111 and 112 of the imaging units 44a and 44b, respectively, extend past the outer edges of the target 88 while providing an overlap 113 in the middle of the target 88. The overlap 113 between the fields of view 111, 112 should be sufficient for the control system to align and stitch together the images captured by the imaging units 44a, 44b. The overlap area 113 may include sufficient number of features to enable the control system to fully reconstruct the combined image from the imaging units 44a, 44b. If the overlap area 113 has sufficient number of features, the process of combining images from the imaging units 44a and 44b can be performed. The extent of the overlap area 113 may also be adjusted depending on the thickness of the target 88 or range of thickness of target 88. For example, as the thickness of the target 88 increases, the width of the overlap area 113 may be decreased. It should be noted that the vision assistive device 100 may employ more than two imaging units.

FIG. 10 illustrates a down-facing imaging unit 44 having a lens 145 and a sensor 144. The lens 145 is generally down-facing to capture an image of the target 88 placed substantially perpendicular to the vision assistive device on the surface, which also supports the vision assistive device 100. The lens 145 has a central axis or a lens axis 147 passing substantially through a center of the lens 145. The central axis or lens axis 147 forms an angle 148 relative to the surface 86 or target 88. As noted above, in some embodiments, the angle 148 is an acute angle. The imaging unit 44 has a field of view (FOV) 146 that covers the target 88, and potentially also covers additional margin to, for example, account for inaccurate positioning of the target or non-standard size of the target. To obtain a desirable FOV, the viewing angle of the imaging unit, its distance away from the target, and its angle are taken into account. The distance of the imaging units 44 from the surface 86 and an angle of the axis of the imaging units to the horizontal plane substantially perpendicular to the housing (for example, surface 86) may be a function of the viewing angle (A) of the imaging units 44, the size of the target 88, and the number of imaging units used. Both the distance and lens axis angle can be adjusted for maximum performance. For example, decreasing the axis angle may improve effective resolution. As a result, the lens axis is not at the centerline of the target, but is closer to the edge which is closer to the imaging unit. By way of a non-limiting example, when employing two imaging units 44a, 44b, the two imaging units 44a and 44b with viewing angle 60° may be positioned approximately 9.3 inches above the surface at an angle of approximately 17.6°, and distanced 5.25 inches from each other to cover a letter sized target with sufficient overlap.

Figure 11:
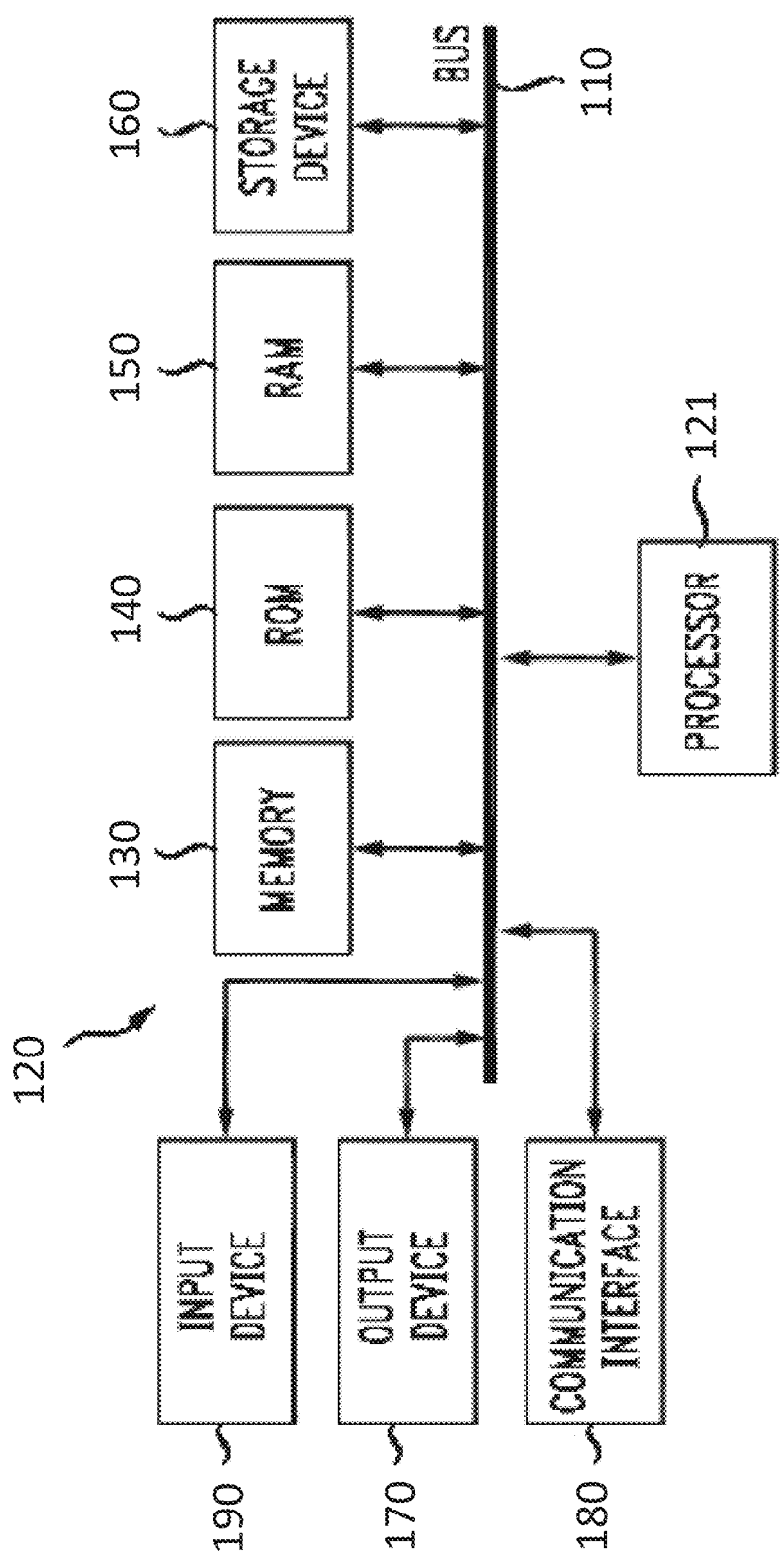
FIG. 11 illustrates an embodiment of a control system for controlling functionalities of a vision assistive device of the present disclosure.

In reference to FIG. 11, the vision assistive device 100 may also include a control system 120 for controlling various functionalities of the vision assistive device 100. In some embodiments, the control system 120 may receive data from the imaging units corresponding to the captured image, process the data, and output the data to the user. In some embodiments, the captured image from the target object 88 may be displayed in an enlarged format in video mode (CCTV), showing the captured image magnified. Either multiple imaging units or a single imaging unit of multiple imaging units can be used in this mode. In some embodiments, especially when the image includes a text portion, the captured image may be segmented into text and graphics.

The text portion may then be further processed, as necessary, such as to reduce blur, skew, and distortion, to prepare the text for optical character recognition (OCR). Upon applying OCR, the text may be outputted in a visual form on a screen 20. As shown in, for example, FIG. 9, in some embodiments, the screen 20 may be integrated into the housing 42 of the vision assistive device 100. Additionally or alternatively, an external screen may be employed. In some embodiments, the control system 120 may include text-to-speech conversion capabilities to enable the vision assistive device 100 to read the OCRed text to the user through a speaker in the housing 42. To deliver audio output, the vision assistive device 100 may include speakers 26.

In the embodiments with multiple imaging units, the control system 120 may also stitch the images captured by multiple imaging units before the image can be analyzed. Various softwares for stitching images may be used. In general, in some embodiments, the image stitching process by the control system 120 can be divided into three main components—1) image registration, 2) calibration, and 3) blending. Image registration may involve matching features in a set of images. The control system 120 may perform OCR of multiple images captured by multiple imaging units and determine position of lines on each image. Next, based on calibration, the processing 120 may determine which lines in the multiple images may be coinciding or overlapping. Based on overlap data, the control system 120 may construct the lines that are intersecting overlap area, thereby reconstruction the original image from multiple captured images. The control system 120 may also employ direct alignment methods to search for image alignments that minimize the sum of absolute differences between overlapping pixels. When using direct alignment methods, the control system 120 might first calibrate images to get better results.

Image calibration aims to minimize differences between an ideal lens models and the imaging unit—lens combination that was used, as well as optical defects and distortions. It also aims at compensating for imperfect lens positioning. Because of the tolerances in lens housing as well as of the top region 64 of the housing 42, the lens axis angle as well as the same angle in other vertical plane may have tolerances. If feature detection methods were used to register images and absolute positions of the features were recorded and saved, stitching software may use the data for geometric optimization of the images. Image blending may involve executing the adjustments figured out in the calibration stage, combined with remapping of the images to an output projection. Colors may be adjusted between images to compensate for exposure differences.

In some embodiments, the control system 120 may be utilized to calibrate multiple imaging units. By way of a non-limiting example, multiple imaging units may be calibrated using chess board pattern. The chess board pattern may be printed on a paper of a size larger then combined field of view (FOV) of the imaging units. The pattern may start on the edge of the target area. The chess-board pattern is easily identifiable by the imaging units and may also have an easily identifiable dot that is located in the middle of the target area. Performing calibration may enable the control system 120 to determine, among other things, the exact position of the center of the target area on each imaging unit, the exact boundaries of the target area, and the exact overlap of the imaging units. The control system may then use this data to facilitate the stitching process.

In some embodiments, images captured with a single imaging unit may need to be stitched too. For example, different parts of the captured image are located at different distances from the imaging unit. The distance difference may be sufficiently large to require focusing of the imaging units 44 on these parts of the captured image separately and capturing separate images to get a sufficiently sharp image of the entire target area upon stitching images of object parts located at different distances. Taking such multiple shots can be done without turning the imaging units or the visual assist device 100. Rather, the imaging units may capture multiple images of the same FOV to have different parts of the imaging units' FOV in focus separately, with appropriate focus adjustment from one shot to another, which may be controlled by the control system 120. The need for capturing separate images of separate parts of the FOV of an imaging unit and then stitching them together may depend on such FOV geometry and on the shape of the target.

By way of a non-limiting example, an imaging unit may be used to capture an image of a flat page such as a flat target object of paper placed on a flat desk surface. The imaging unit may be fixed in space, so that the distance from the imaging unit to the page becomes as a function of the pixel location is known. The distance may vary from one part of the FOV to another. For this reason, the focal depth of the imaging unit may be insufficient to image the entire page sharply enough in a single shot. If so, a proximal part of the page may be imaged with the imaging unit focused on it, and, separately, a distant part of the page may be imaged separately according to its own distance from the imaging unit. The two images are therefore captured separately by a single imaging unit and then stitched together by the control system. More than two images can be captured and stitched together in a similar manner. When the imaging unit is integrated with the housing as, for example, shown in FIG. 8 and FIG. 9, there may be more variation in the distance between the imaging unit and different parts of the target 88. Accordingly, in some embodiments, the process for stitching images from a single imaging unit 44 may be utilized to prepare an image of desired quality prior to stitching images from multiple imaging units together. Moreover, even in case of the device with a single imaging unit 44 adjacent to or over the centerline 85, the distance between the imaging unit and the center of the target may be smaller than the distance between the imaging unit and the corners.

In some embodiments, the control system 120 may be programmed to select multiple focusing. The control system 120 can be programmed to analyze the imaging unit-to-object distance distribution within the FOV. Accordingly the control system 120 can give a command to take either a single shot or multiple shots of the FOV, the imaging unit's focus being adjusted to the distance in each direction selected for imaging. The control system 120 may also select the number of such shots, their focal distances and the corresponding shapes and sizes of the areas of the FOV to be stitched together upon capturing their images. Such selection by the control system 120 can take into account the inherent known geometry of the visual assist device standing on a flat desk. Focus distance can be measured toward at least one point in the object. For an object such as a stack of pages, both the inherent known geometry and possibly at least one focus distance measurement can be taken into account. Control system 120 may be programmed such that the control system 120 can find the optimal focal position to a predefined region of the target, and then assumes that the difference between focal positions between different regions is known.

Referring back to FIG. 11, the control system 120 may include a processor 121 coupled to various system components by a system bus 110. The system components may include the system memory such as read only memory (ROM) 140 and random access memory (RAM) 150 to the control system 120. Other system memory 130 may be available for use as well. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The control system 120 may further include storage devices such as a hard disk drive 160, a solid state storage, magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the control system 120.

Any number of input mechanisms 190, external drives, devices connected to ports, USB devices, such as a microphone for speech, touch-sensitive screen for gesture or graphical input, keyboard, buttons, imaging unit, mouse, motion input, speech and so forth can be connected to the control system 120. The output device 170 can be one or more of a number of output mechanisms known to those of skill in the art, for example, printers, monitors, projectors, speakers, and plotters.

In various embodiments, multimodal systems enable a user to provide multiple types of input to communicate with the control system 120. The communications interface 180 may generally govern and manage the input and system output.

It should be noted that the control system 120 is illustrated as comprising individual functional blocks (including functional blocks labeled as a "processor"). The functions these blocks represent may be provided through the use of either shared or dedicated hardware, including, but not limited to, hardware capable of executing software. For example the functions of one or more processors may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI or FPGA circuitry in combination with a general purpose DSP circuit, may also be provided.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage, solid state or other storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Figure 12:
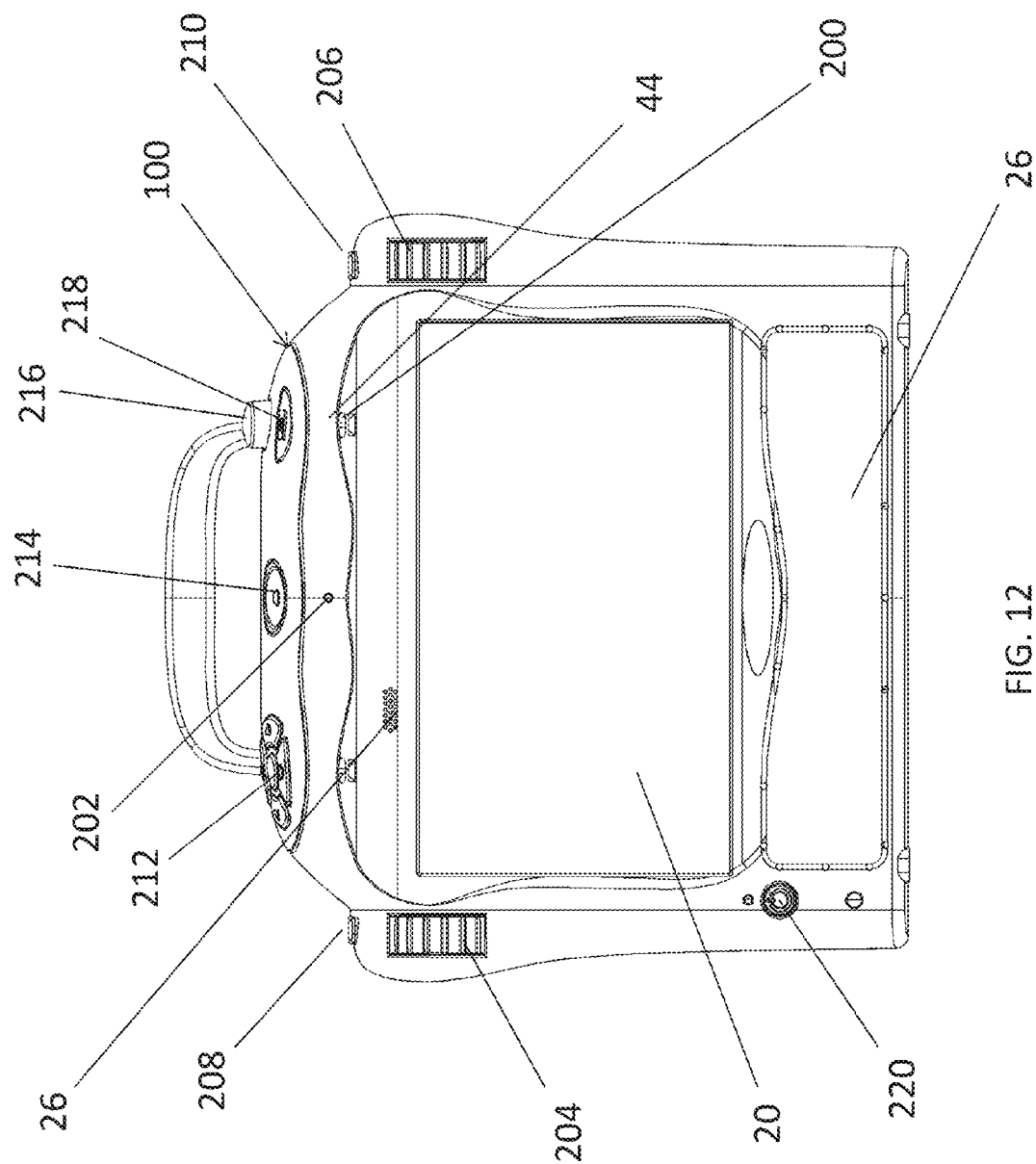
FIG. 12 is a front view on an embodiment of a vision assistive device of the present disclosure showing various control features of the vision assistive device.

In reference to FIG. 12, in some embodiments, the vision assistive device 100 may include one or more light sources 200 adjacent to the imaging units 44 for illuminating the target 88. In some embodiments, the light source may include one or more light emitting diodes (LEDs). In some embodiments, the light sources 200 may be spaced away from imaging units 44 and may be shared by the imaging units 44.

The vision assistive device 100 may also include a user-facing imaging unit 202, which can be used for imaging the user for such purposes as video telephony. The user-facing imaging unit 202 may be configured to be facing the user sitting in front of the vision assistive device 100. It should of course be understood that the user-facing imaging unit 202 can image any other object, for example, it can serve for surveillance. A switch may be provided to activate the user-facing imaging unit 202, while deactivating other image capturing units 44. The switch may inform the control system 120 which may then switch activity between the user-facing imaging unit 30 and the other imaging units 44, and optionally turns an indicator light on to let the user know which imaging unit is active, if any. In some embodiments, such a switch can alternatively be triggered by an accelerometer sensing the angle between the neck 32 and the horizontal plane. Optionally, such a switch does not deactivate any imaging units, but rather selects which of the imaging units, if any, sends its image to be displayed to the user. Multiple switches can be used.

The vision assistive device 100 may further include one or more analog controls. For example, the vision assistive device 100 may include one or more rollers 204, 206 for controlling, selecting, activating or deactivating, various functionalities of the vision assistive device 100. When the user rotates the one or more rollers 204, 206, the control system 120 notes in which direction and by how many degrees the one or more rollers 204, 206 are rotated, the control system 120 translates the rotation of the one or more rollers 204, 206 into various functions. Examples of such functions include, but not limited to, scrolling the image or text up/down on the screen 20, in a page-down and page-up or line up and line down manner; moving between menu items, scroll through telephone director or address book to another, scroll through image (for example, roller 204 does vertical scrolling while roller 206 does horizontal scrolling), zooming image in and out, controlling reading speed, hanging font size and similar functions. In some embodiments, as the user rotates the one or more rollers 204, 206 icon or clickable images are highlighted on the screen 20 for selection by the user.

Other analog controls of the vision assistive device 100 may include a plurality of buttons 208, 210, 212, 214, 216 and 218 for controlling the functionalities of the vision assistive device. The control system 120 by its software, assigns (defines the designation of) various functions to the buttons 208, 210, 212, 214, 216 and 218. By way of a non-limiting example, buttons 208 and 210 may be assigned a select function for selecting items from a menu. Buttons 212, 214, 216 and 218 may be located on the top surface of the housing 42 of the vision. These buttons may be such functions as volume control (some of the buttons can be rotary knobs) of voice/speech output (audio), speed control of voice/speech output (audio), snapshot, mode switching, magnification control, brightness, contrast. The vision assistive device 100 may further include a power on/off button 220.

In some embodiments, as noted above, one or more rollers 204, 206 may be used to scroll through the image to select a portion of the text, by the roller or using one of the buttons, that can then be zoomed in or out to a desired size by, for example, using the other roller 204, 206. In some embodiments, buttons may be used to prompt the control system 120 to provide audio output of the selected portion to the user.

As noted above, the control system 120 of the vision assistive device 100 may enable the vision assistive device 100 to have various functionalities. Following is a description of some examples of the functionalities that may be included in the vision assistive device of the present disclosure. The vision assistive device 100 may include one or more of the functionalities discussed below, as well as additional functionalities typically included in similar devices.

In some embodiments, the vision assistive device 100 of the present disclosure can be connectable to the Internet by wire or wireless connection, for browsing websites, emailing, and providing customized services such as customized news, weather forecast, traffic conditions, making police or medical emergency calls with one button push remotely from other rooms using WiFi for example using a bracelet, etc. Internet activity can be similar to that by general public, while its control by the user is preferably done via perceived mechanical means, such as large buttons, sliders, rollerwheels and knobs, for example by scrolling up and down through the list of user's favorite websites, TV channels, movies, or email contacts. Icons and/or clickable images on screen 20 can be highlighted, one by one in turn, by turning the rollers 204 and/or 206. A highlighted image can then be clicked on by pushing a button. Such a button can be one of buttons 208 and 210 located above in proximity to rollers 204 and/or 206. Emailing can be done by writing by means of speech recognition (speech-to-text conversion by either the vision assistive device 100 or the server) or/and by sending voice-messages.

In some embodiments, the vision assistive device 100 of the present disclosure can be connectable to a dedicated server to receive personalized web services. Services can be personalized, for example, when the vision assistive device 100 connects to a server designated to providing services to this kind of vision assistive device 100. The server may know (from a code provided by the vision assistive device 100 to the server, such as the vision assistive device 100 serial number) which info to provide to the user of the vision assistive device 100. For example, the server may provide weather forecast based on the user residence. Similarly, if the user is interested in train or bus schedule, the server may provide such information based on user's location. In some embodiments, the server can store images taken by the vision assistive device 100 and make them available to designated persons, such as user's relatives, care-takers or doctors. For example, the images can be of the user, captured by user-facing imaging unit 202, or of a document, captured by the imaging unit 44. In some embodiments, Internet navigation or/and navigation within a vision assistive device 100-dedicated server can be done by the user without either keyboard, mouse, or touch screen. Rather, the user may use perceived mechanical controls such as buttons and roller wheels described above.

In some embodiments, the service types provided by the server can be personalized too, as the designated server identifies the user. For example, the user may have a personalized list of movies and/or TV channels to watch on the vision assistive device 100 via the Internet. The user may choose to place specific personal medical information on the server for viewing by selected individuals only. Email writing can be done by means of speech recognition (speech-to-text conversion by either the vision assistive device 100 or the server) or/and by sending voice-messages.

In some embodiments, the vision assistive device 100 may be configured to output information in a simplified format. For example, long passages of text unrelated to clickable images and phrases can be shrunk or removed. Also or alternatively, small font text can be shrunk or removed.

In some embodiments, the vision assistive device 100 may include a microphone and recording capabilities to allow the user to record reminders to self or others, or other messages. Playback options may be included for the user to retrieve the recorded messages.

In some embodiments, the vision assistive device 100 of the present disclosure can be connectable to a phone line. In this manner, the vision assistive device 100 may be used as a fax and provide customized services such as customized news, weather forecast, traffic conditions, making police or medical emergency calls with one button push remotely from other rooms using Wi-Fi for example using a bracelet, etc. Such services can be personalized similarly to Internet services described above. A phone line without a broadband Internet access can still provide an old fashioned dial-up Internet access, even if the user does not realize how the vision assistive device 100 is accessing the Internet.

In some embodiments, the vision assistive device 100 can serve for surveillance purposes, either video, still or audio. For surveillance, such as for burglary or break-in alarm purposes, control system 120 can be equipped with software able to distinguish between images (either still or video) of humans from those of animals, such as dog, rabbit, cat, deer, coyote, etc. Switching to either of these modes or to a combination thereof can be done by means of pulling out, pushing in, sliding, or turning a large unit of control as described. Similar mechanical movements can be used for customization of the vision assistive device 100, in other words, for fixing the modes, applications, or other settings available on this vision assistive device 100. In this way, perceived analog controls can be used for setting up the vision assistive device 100, not only for using it. In some embodiments, upon detection of an alarming event, the vision assistive device 100 may notify the user, local police department or a security company, phone, email, SMS or any other means.

In some embodiments, the vision assistive device 100 can be programmed to remind the user to take medications or take other actions, possibly on a daily basis. For this purpose, the vision assistive device 100 may include a calendar and a clock, as well as a medication administration schedule in control system 120. The schedule program can produce audio or/and visual pill-time signals to let the user know when to take a medication. This function is similar to an alarm clock. The pill-time signal can be accompanied by information, such as text or speech.

In some embodiments, the pill-time signal can also go to a caregiver, by phone, email, SMS or any other means. The caregiver can then assist the user of the vision assistive device 100 in selecting the proper medication and advise about the proper administration. The caregiver can watch the medications and/or the vision assistive device 100 user taking the medication to make sure it is administered properly. One way to watch is using a connection via the Internet. Any of the imaging units in the vision assistive device 100 can be used for such watching. A dedicated caregiver may be allowed to change the medical schedule in control system 120 over the Internet.

In some embodiments, the vision assistive device 100 itself can assist in choosing the correct medication package, by recognizing the image of the package or on the package, such as a barcode, text, symbol, etc. For example, upon the pill-time signal, the user can bring a pill bottle into the FOV of the imaging unit 44. The control system 120 can use image recognition software to determine whether the bottle is correct for administration of the medication according to the pill-time signal. Then the control system 120 can give positive or negative feedback (audio and/or video) to inform the user whether the package is correct or not.

In some embodiments, the user of the vision assistive device 100 may have a tray of medications, the medications being placed in multiple compartments. Medications in a compartment are intended for administration within a certain time interval, possibly together. Each compartment has a cover. A cover may have a unique identifiable symbol. 1D or 2D barcode is one example of such a symbol. When a pill-time signal goes off, the user should put the tray into the FOV of imaging unit 44 and then open the compartment believed to contain the medication according to the pill-time signal. The control system 120 may use image recognition software to tell whether the compartment is right judging by whether the correct symbol has disappeared. Alternatively, identification of the compartment is done judging by the location of the compartment in the tray. Then the vision assistive device 100 informs the user whether the open compartment is the correct one. After the user takes pills from the compartment, control system 120 can use image recognition software to compare the pills remaining in the compartment, which may be zero pills or more, with the pills that had been there originally. Pill size, color, number, etc. can be used for such comparison. The comparison can tell whether the pill administration has been correct.

In some embodiments, the vision assistive device 100 can further register the compliance of the user with the medication administration schedule. For example, the user can be required to press a button to confirm the pill is taken. Or the user may be required to hold an open hand with a pill in it under a imaging unit of the vision assistive device 100 for capturing an image of it before taking the pill. The captured image may serve as evidence of the user having taken a pill. The captured image may even tell which pill was taken, upon image recognition by either a human or machine. The combination of the medical schedule calendar, control system 120, and the imaging unit in the vision assistive device 100 is essential for follow up to ensure compliance. Compliance (also adherence or capacitance) describes the degree to which a patient correctly follows medical schedule. Most commonly, it refers to medication or drug compliance, but it can also apply to other situations such as medical device use, self-directed exercises, or therapy sessions.

In some embodiments, the vision assistive device 100 acts upon user's error. The control system 120 can be programmed so that in case the user makes an identifiable error (i.e. takes a wrong pill, has not taken it at all, etc.) the vision assistive device 100 can take appropriate measures, such as inform a caregiver and/or emergency service via email, SMS or automatic phone call, log the occurrence into a trouble list, or repeat the pill-time signal again later.

In some embodiments, the vision assistive device 100 may be programmed to allow the user to play various games using the vision assistive device 100. For example, the imaging unit 44 can be used to capture images of crossword puzzles from paper, with user's hand-written scribbles on them. Then, upon image recognition and text recognition and processing, the control system 120 can present the puzzle in a convenient format on the screen 20. Such format can be displaying the question next to the corresponding column/row of the wanted word on the screen 20. To get this convenient display, the user can point at either the puzzle question or the column/row of interest with a pen or finger. The control system 120 can identify such pointing by means of image recognition software, and display the puzzle question next to the corresponding column/row.

Other uses of recognition and processing of printed text captured by the imaging unit 44 can be employed in the vision assistive device 100 of the present disclosure. For example, displaying magnified text on the screen 20 can be useful for low vision users, making reading easier. The magnified display can be either in video mode (CCTV), showing the captured image as is, or upon OCR (optical character recognition) in an artificial font. Upon OCR and further upon text-to-speech conversion, the vision assistive device 100 can read aloud what the printed text says. Such speech output can be useful for blind users, making the vision assistive device 100 a reading machine.

In various embodiments, the vision assistive device 100 of the present disclosure can be equipped with various sensors other than an imaging unit. Exemplary sensors include, but are not limited to, sensors for monitoring physiological data, such as blood pressure, heart rate, glucose level in blood, body temperature, etc. Additional sensors may include a microphone, smell sensor, fire alarm sensor, smoke detector, ambient temperature sensor, humidity sensor, atmospheric pressure sensor, carbon monoxide sensor, etc. The data collected by the sensors can be outputted on the screen 20. In some embodiments, audio output can also be used. Medication administration schedule stored in the control system 120 can be displayed or read aloud too. Switching to either of these modes of sensing and outputting or to a combination thereof can be done by means of pulling out, pushing in, sliding, or turning a large unit of control as described.

For example, a carbon monoxide sensor can be built-in within or connected to the vision assistive device 100 (by wire or wirelessly). When carbon monoxide level in the air exceeds a predetermined level, the vision assistive device 100 can alarm the user with audio and/or visual messages. Such messages can reach other rooms wirelessly. The vision assistive device 100 can send such messages by email or/and phone to designated recipients such as relatives, neighbors, or/and fire department. Turning such a carbon monoxide sensor (or its connection to the vision assistive device 100) on and off can be done by means of pulling out, pushing in, sliding, or turning a large unit of control as described. A carbon monoxide sensor is just one example. Other sensors, such as blood pressure, heart rate, glucose level in blood, body temperature, etc., can be used similarly and so can their alarm messages.

In some embodiments, the user can control the vision assistive device 100 by gestures. The printed text converted into magnified text on a monitor (for example as a scrolling line), or into speech, is intended for user's consumption. In the process of such output consumption, the user may wish to have control over the flow of the output text or speech. Specifically, such control may involve giving commands similar to what is called in other consumer players "Stop", "Play", "Fast-Forward" and "Rewind" commands. Commands such as "Zoom In", "Zoom Out" can also be given by gestures, even though they may not be common in other consumer players. When such commands are to be given, the imaging unit is usually in video mode, yet is not monitoring turning pages in book-scanning setting. Thus, the imaging unit can be used to sense a specific motion or an image that signals to the algorithm that the corresponding command should be executed. For example, moving a hand in a specific direction under the imaging unit can signal one of the above commands. Moving a hand in a different direction under the imaging unit can signal a different command. In another example, the field of view of the imaging unit can be arranged to have a horizontal arrow that can be rotated by the user around a vertical axis. The image-processing algorithm can be pre-programmed to sense the motion and/or direction of the arrow. Such a motion can be detected and a change in the direction of the arrow can be identified as a signal. Here we call such a signal a "gesture". A common software algorithm for the identification of the direction of motion, known as "Optical Flow" algorithm, can be utilized for such gesture recognition.

The interpretation of a gesture can be pre-programmed to depend on the current state of the output flow. For example, gesture interpretation can differ between the states in which 1) the text is being read out (in speech) to the user, 2) the text reading has been stopped, and 3) magnified text is being displayed. For example the gesture of moving a hand from right to left is interpreted as the "Stop" (aka "Pause") command if the output text or speech is flowing. Yet, the same gesture can be interpreted as "Resume" (aka "Play") if the flow has already stopped.

Moving a hand in other manners can signal additional commands. For example, moving a hand back and forth (e.g. right and left), repeatedly, can signify a command, and repeating this movement a preset number of times within a preset time-frame can signify various additional commands. Gestures can also be interpreted as commands in modes other than output flow consumption. For example, in Video Mode, a gesture can give a command to change optical zoom or digital magnification. For this purpose, it is desirable to distinguish motion of a hand from other motion, such as motion of printed matter under the imaging unit. Optionally, the software that processes the video stream can recognize shapes of human fingers or the palm of the hand. With this capability, the software can distinguish motion of the user's hands from motion of the printed matter.

In some embodiments, the vision assistive device 100 may include a motion detector to switch on and off various functions of the vision assistive device 100. For example, the vision assistive device may be used for scanning of a book. During scanning of a book, alternating time intervals of motion and no motion can convey the process of turning pages. Such time intervals of motion and no motion can be considered as gestures too, even if the motion direction is irrelevant for the interpretation of the gesture. For example, as a page of a book is being turned, motion is being detected by motion detector software in the control system 120, while monitoring video stream via an imaging unit that faces printed matter. The detected motion may be either that of a hand or that of printed matter. The fact that the page has been turned over and is ready for photographing is detected by the motion detector as the subsequent absence of motion. In practice, if motion (as observed by the detector) has dropped and stayed below a preset level for a preset time interval, the software interprets the drop as the page having been turned over. This may trigger taking a picture (photographing, capturing a digital image, a shot) and signaling this event to the user. Before the next shot is taken, the detector should see enough motion again and then a drop in motion for a long enough period of time. In this mode (e.g., book scanning), motion in any direction is being monitored, unlike in specific hand gesture recognition during output consumption, where motion in different directions may mean different commands.

In some embodiments, once a photograph of the target is stored, its text characters, word sets and other features can be used as recognizable images. The control system 120 can assign those features to their coordinates (position) in the field of view (FOV) of the imaging unit. In other words, the images corresponding to a specific coordinate range are not pre-defined a priori but rather assigned to their position after photographing the target. One use of these page features is giving commands by covering and uncovering these images, e.g. by hand. This may include hand gestures seen as time sequences of covered and uncovered images (and thus their positions). The stored page image can work for this purpose as long as the page remains under the imaging unit with no appreciable shift relative to its location when imaged. The presence of the page with no shift may be monitored. If the page with no shift is absent, the algorithm can search 1) for another page or 2) for the same page with a shift. In both cases the images seen by the imaging unit can serve as a new predefined recognizable image set as described above. For example, moving a hand over such a page can signify various commands depending on the direction of the movement. For another example, covering a specific portion of such a page with a hand can also signify a command. By way of another non-limiting example, covering a subset of images located around a specific corner of the FO, as viewed from the imaging unit, may signal a command that is different from a command signaled by covering a subset of images around a different corner of the FOV. Such covering can be achieved by placing printed matter, a hand, or other objects on a subset of images or above it. The resulting commands can include the "Stop", "Play", "Fast-Forward" and "Rewind" commands, as well as activating the motion-detector mode for scanning a book.

Time sequences of such covered and uncovered images can be pre-programmed to encode various commands. A large number of commands can be encoded by such time sequences. Moving a hand above the surface of images in a specific manner can signal commands by way of covering and uncovering the images in various order (sequences). For example, moving a hand back and forth (e.g. right and left) can signify a command. Repeating this movement a preset number of times within a preset time-frame can signify various additional commands. In such gesture recognition, the shape of a hand can be used to differentiate such hand gestures from movement of printed matter over the surface. Such shape can be indicated by the silhouette of the set of images covered at any single time. Also, image recognition algorithms can be used for the purpose of recognizing hands, fingers, etc.

In some embodiments, a vision assistive device includes a housing having a base for positioning the housing on a surface; one or more imaging units disposed along a top portion of the housing, each imaging unit being angled downward so a central axis of the imaging unit forms an acute angle with the surface so the imaging unit captures a target image from a target object; and a control system accommodated within the housing, the control system being connected to the one or more imaging units to process the target image captured by each imaging unit and to output the target image to a user.

In some embodiments, a vision assistive device includes a housing having a base for positioning the housing on a surface; one or more imaging units configured to capture a target image from a target object positioned substantially perpendicular to the housing; a screen integrated with the housing; a control system accommodated within the housing, the control system being connected to the imaging units to process data corresponding to the image captured by the imaging units and to output the target image to a user on the screen.

In some embodiments, a method for providing vision assistance includes disposing a housing substantially perpendicular to a surface, the housing including one or more imaging units and a control system; capturing with the one or more imaging units a target image from a target object placed on the surface adjacent to the housing; and processing the captured target image and outputting the target image on a screen integrated with the housing.

All patents, patent applications, and published references cited herein are hereby incorporated by reference in their entirety. It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. It will be appreciated that several of the above-disclosed and other features and functions, or alternatives thereof, may be desirably combined into many other different systems or applications. All such modifications and variations are intended to be included herein within the scope of this disclosure, as fall within the scope of the appended claims.

What is claimed is:

1. A vision assistive device comprising:
   a housing having a base for positioning the housing on a surface, a top portion, and a front wall, back wall, and side walls connecting the base to the top portion and together defining an inner volume of the housing, wherein the top portion protrudes outward from the front wall of the housing;
   multiple imaging units spaced away from one another along the top portion of the housing, each imaging unit being stationary with respect to the housing and angled downward so a central axis of each imaging unit forms an acute angle with the surface so each imaging unit captures a target image from a target object; and
   a control system accommodated within the inner volume of the housing, the control system being connected to the multiple imaging units to process the target image captured by each imaging unit.

2. The vision assistive device of claim 1 wherein the imaging units are positioned substantially over an edge of the target object positioned on the surface adjacent to the housing.

3. The vision assistive device of claim 1 comprising two imaging units spaced apart from one another.

4. The vision assistive device of claim 3 wherein the two imaging units are configured to capture overlapping portions of the target image.

5. The vision assistive device of claim 4 wherein the control system is programmed to combine the overlapping portions.

6. The vision assistive device of claim 1 wherein the central axis of the imaging units forms an acute angle with a plane defined by the front wall of the housing.

7. The vision assistive device of claim 1 further comprising a screen located between the base and the top portion of the housing for outputting the target image to the user.

8. The vision assistive device of claim 7 further comprising one or more rollers for scrolling through the target image displayed on the screen and enlarging desired portions of the target image.

9. The vision assistive device of claim 1 further comprising one or more sensors selected from the group consisting of smoke detector, carbon monoxide detector, temperature sensor, humidity sensor, motion detection sensor and combinations thereof.

10. A vision assistive device comprising:
    a housing having a base for positioning the housing on a surface, a top portion, and a front wall, back wall, and side walls connecting the base to the top portion and together defining an inner volume of the housing;
    two or more imaging units configured to capture a target image from a target object positioned substantially perpendicular to the housing;
    a screen integrated with the front wall of the housing for displaying the target image;
    a control system accommodated in the inner volume within the housing, the control system being connected to the imaging units to process data corresponding to the image captured by the imaging units and to output the target image to a user on the screen; and
    one or more rollers disposed on the front wall of the housing, the one or more rollers being configured for scrolling through the target image displayed on the screen and enlarging desired portions of the target image;
    wherein the two or more imaging units are configured to capture overlapping portions of the target image with the control system being programmed to combine the overlapping portions.

11. The vision assistive device of claim 10 wherein the multiple imaging units are integrated with the housing.

12. The vision assistive device of claim 10 wherein the multiple imaging units are spaced away from the housing.

13. The vision assistive device of claim 10 wherein the central axis of each imaging unit of the multiple imaging units forms an acute angle with a plane defined by the front wall of the housing.

14. The vision assistive device of a claim 10 further comprising one or more analog controls for controlling one or more functionalities of the vision assistive device, the one or more functionalities being selected from the group consisting of alarm clock, calendar, security surveillance, digital frame, games, medication reminders and combinations thereof.

15. A vision assistive device comprising: a housing having a base for positioning the housing on a surface; two or more imaging units disposed along a top portion of the housing, each imaging unit being angled downward so a central axis of each imaging unit forms an acute angle with the surface so each imaging unit captures a target image from a target object;
- a screen integrated with the housing for displaying the target image;
- a control system accommodated within the housing, the control system being connected to the two or more imaging units to process the target image captured by each imaging unit and to display the target image on the screen; and
- the imaging units configured to capture overlapping portions of the target image with the control system functioning to combine the overlapping portions;
- one or more rollers disposed on the front wall of the housing, the one or more rollers being configured for scrolling through the target image displayed on the screen and enlarging desired portions of the target image.

16. The vision assistive device of claim 15 comprising one imaging unit positioned in a center of the top portion of the housing.

17. The vision assistive device of claim 15 comprising two imaging units spaced apart from one another.

* * * * *